United States Patent [19]

Logie et al.

[11] Patent Number: 4,598,685

[45] Date of Patent: Jul. 8, 1986

[54] FUEL PUMPING APPARATUS

[75] Inventors: Frank M. Logie, London; Ronald Phillips, Northolt, both of England

[73] Assignee: Lucas Industries public limited company, Birmingham, England

[21] Appl. No.: 753,373

[22] Filed: Jul. 10, 1985

[30] Foreign Application Priority Data

Jul. 13, 1984 [GB] United Kingdom ................. 8417840

[51] Int. Cl.⁴ ...................... F02M 39/00; F16K 11/04

[52] U.S. Cl. .................................... 123/506; 123/458; 137/471; 137/878; 251/95; 251/228; 417/440

[58] Field of Search ............... 123/506, 458, 500, 501; 417/440, 278; 137/565, 471, 878; 251/89, 95, 58, 228

[56] References Cited

U.S. PATENT DOCUMENTS

| | | | |
|---|---|---|---|
| 3,491,795 | 1/1970 | Jennings | 137/878 |
| 3,794,067 | 2/1974 | Beck | 137/878 |
| 4,027,849 | 6/1977 | Muller | 251/58 |
| 4,200,073 | 4/1980 | Stoltman | 123/458 |
| 4,378,775 | 4/1983 | Straubel | 123/458 |
| 4,425,941 | 1/1984 | Weaver | 137/878 |
| 4,475,507 | 10/1984 | Miyaki | 123/458 |
| 4,502,445 | 3/1985 | Roca-Nierga | 123/458 |
| 4,519,351 | 5/1985 | Archer | 123/458 |
| 4,530,329 | 7/1985 | Maisch | 123/458 |
| 4,545,560 | 10/1985 | Marchdet | 251/58 |

FOREIGN PATENT DOCUMENTS

| | | | |
|---|---|---|---|
| 2101580 | 7/1972 | Fed. Rep. of Germany | 251/95 |
| 1009999 | 6/1952 | France | 137/471 |
| 1257143 | 2/1961 | France | 251/95 |
| 0041462 | 3/1982 | Japan | 123/506 |
| 0065857 | 4/1982 | Japan | 123/458 |

*Primary Examiner*—Carl Stuart Miller

[57] ABSTRACT

A fuel pumping apparatus for supplying fuel to an internal combustion engine includes a valve means operable to control the spillage of fuel from a high pressure pump. The valve means includes first and second valve elements connected by a pivotal beam carried on a pivot movable in the direction of valve closure when an actuator is energized. The first valve element is biased by a spring to the open position and through the beam the second valve element is held in the closed position by the pressure developed by the pump and the second valve element is urged to the open position by the pressure but can be held closed against the pressure by the actuator. When the actuator is de-energized the second valve element is urged open by the pressure to lower the pressure and the spring then opens the first valve element and closes the second valve element.

3 Claims, 2 Drawing Figures

FUEL PUMPING APPARATUS

This invention relates to fuel pumping apparatus for supplying fuel to an internal combustion engine and of the kind comprising a plunger reciprocable within a bore, an outlet which in use is connected to the bore at least during the time the plunger is moved inwardly to displace fuel from the bore, said outlet in use being connected to a fuel injection nozzle of the associated engine, means through which fuel can be supplied to the bore and valve means operable during inward movement of the plunger to allow fuel to escape from the bore thereby to control the amount of fuel flowing through said outlet.

In a known form of apparatus a single electromagnetically operated valve is provided to control the escape of fuel from the bore. The valve has to be capable of being closed to prevent escape of fuel following which it must be capable of being held closed against the high pressure of fuel developed in the bore and then it must be capable of being opened to allow the pressure in the bore to fall. It is possible to design a valve which has a pressure balanced valve member so that little effort is required to move the valve member to open and close the valve. However, since the valve is electromagnetically operated a finite time will be required to move the valve member and the time available to move the valve member decreases as the engine speed increases so that the apparatus can only operate in a satisfactory manner up to a limited engine speed. In order to increase the rate of valve closure or opening the valve member can be designed so that it is not pressure balanced. If the valve member is designed so that increasing pressure in the bore produces a force on the valve member acting to close the valve then an increased force must be generated when it is required to open the valve. Conversely if the valve member is designed so that the pressure in the bore acts to open the valve an increased force must be generated to close the valve.

British Patent Specification No. 1305930 discloses an apparatus which has two valves wnich are operated by electromagnetic actuators respectively, the two valves being operated in a sequence to control the escape of fuel from the bore and thereby the timing and quantity of fuel delivered through the outlet. One of the valves has a valve element which is spring biased to the closed position and is opened by the associated actuator. Moreover, as the valve opens an increased area of the valve element is exposed to the fuel pressure in the bore so that the valve opens quickly and this valve is used to terminate delivery of fuel. The other valve has a valve element which is spring biased to the open position of the valve and it is urged to the closed position by energising its actuator to achieve supply of fuel through the outlet. The actuator does however have to hold the valve closed against the pressure of fuel in the bore. Apart from the fact that the latter valve is not assisted by the fuel pressure in the bore in moving to the closed position, the apparatus does require two electromagnetic actuators together with the respective power control circuits.

The object of the present invention is to provide a fuel pumping apparatus of the kind specified in a simple and convenient form.

According to the invention in an apparatus of the kind specified said valve means comprises a first valve having a valve element which in the closed position of the valve is subjected to the pressure in the bore to hold the valve closed, a second valve having a valve element which in the closed position of the valve is subjected to the pressure in the bore to open the valve, a pivotal beam interconnecting the valve elements of the two valves, a pivot for the beam, said pivot being positioned intermediate the points of contact of the beam with the valve elements, an electromagnetic actuator which when energised moves the pivot in a direction of movement substantially parallel to the axes of movement of the valve elements and in the direction of valve closure and resilient means biasing the valve element of the first valve to the open position, the arrangement being such that in the de-energised condition of the actuator the resilient means will hold the second valve closed and the first valve open and when the actuator is energised the first valve will be closed to prevent fuel escaping from the bore, the increasing pressure within the bore as the valve closes assisting closure of the valve, and the actuator maintaining the second valve closed and when the actuator is de-energised, the second valve will open under the action of fuel pressure to permit fuel to escape from the bore.

An example of a fuel pumping apparatus in accordance with the invention will now be described with reference to the accompanying drawings in which.

Figure 1:
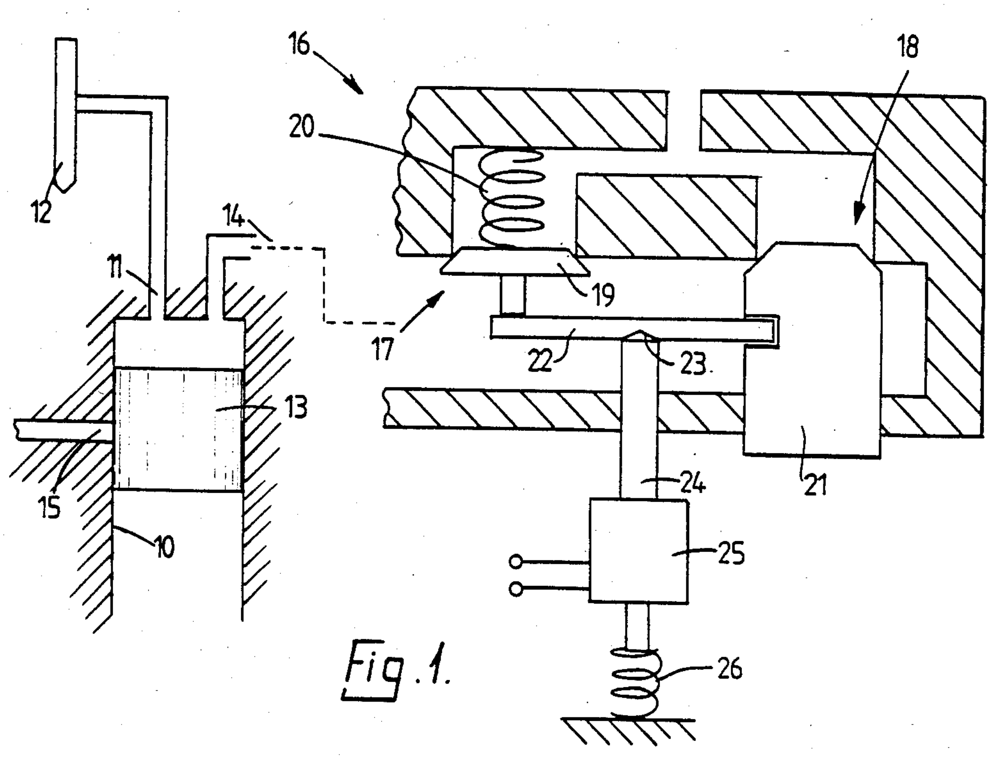
FIG. 1 is a diagrammatic representation of the apparatus.

Referring to FIG. 1 of the drawings the pumping apparatus comprises a bore 10 having an outlet 11 at one end thereof for connection in use to a fuel injection nozzle 12. Slidable in the bore is a pumping plunger 13 which is arranged to be reciprocated in known manner, through a fixed stroke by for example a cam driven by the associated engine operating in conjunction with a plunger return spring. The one end of the bore also communicates with a spill passage 14 and formed in the wall of the bore is a port 15 which is arranged to be uncovered by the plunger 13 as the latter is moved outwardly. The port 15 is connected to a source of fuel at a low pressure. A valve means generally indicated at 16 is provided to control fuel flow along the spill passage 14 and assuming for the moment that the valve means is set to prevent flow of fuel, as the plunger 13 is moved inwardly and covers the port 15, the fuel contained in the one end of the bore will be delivered through the injection nozzle 12, the pressure in the bore during this process rising to a high value. As the plunger moves outwardly a point will be reached at which the port 15 is uncovered and a fresh supply of fuel can flow into the bore.

In order to control the amount of fuel supplied to the injection nozzle, the valve means 16 is provided and this as will be seen, comprises a first valve 17 and a second valve 18. The first valve has a valve element 19 which can be closed onto a seating and is urged away from the seating by the action of a first spring 20. When closed onto its seating the valve element is unbalanced and the pressure of the fuel in the one end of the bore 10 acts to maintain the valve element 19 in contact with its seating and therefore the valve 17 in the closed position. The second valve 18 includes a cylindrical valve element 21 which in the closed position as shown, co-operates with a seating to prevent flow of fuel from the bore but the valve element 21 is dimensioned such that an annular area of the valve element is exposed to the pressure in the bore 10 and acts to urge the valve element to the open position and the end of the valve element remote from the seating is exposed to a low pressure.

The valve elements are coupled together by means of a beam 22 which is pivotally mounted on a pivot 23 carried at the end of a rod 24 which constitutes the output member of an electromagnetic actuator 25. The direction of movement of the rod 24 is parallel to the axes of movement of the valve elements 19 and 21 and the pivot 23 supports the beam intermediate its ends. The rod 24 is lightly biased in the direction of valve closure by means of a coiled compression spring 26 and the actuator 25 is arranged so that when it is energized, the rod 24 is moved in the direction of valve closure.

In FIG. 1 of the drawings the two valves are shown in the closed position and the plunger 13 is moving inwardly. Fuel therefore cannot flow along the spill passage 14 and the displaced fuel will flow through the injection nozzle. The actuator 25 is in the energized condition. If now the actuator is de-energized, the pressure of the fuel in the bore acting on the valve element 21 will immediately urge it to the open position, the beam 22 pivoting about its point of contact with the valve element 17. Movement of the valve element 21 away from its seating will result in a lowering of the pressure in the bore and a cessation of fuel flow to the injection nozzle. It will be noted that as the valve element 21 moves to its open position more of the end of the element will be exposed to the pressure in the bore and as a result rapid movement of the element will take place thereby resulting in a rapid cut-off of the fuel flowing to the injection nozzle. When the pressure in the bore has fallen to the drain pressure, the spring 20 will urge the valve element 19 to its open position and in so doing the valve element 21 will be returned to its closed position, the two springs 20 and 26 being tailored to produce this effect.

With the valve element 19 open and the valve element 21 closed, and the actuator in the de-energized condition, as the plunger moves inwardly following its outward movement and replenishment of the bore 10 with fuel, fuel will be displaced through the passage 14 and will flow past the the valve element 19, the force exerted by the spring 20 being sufficient to hold the valve element 19 away from its seating and the valve element 21 in its closed position. In order to obtain delivery of fuel through the injection nozzle, the actuator 25 is energized and the rod 24 moves upwardly as shown in the drawing to close the valve element 19 onto its seating. As the valve element moves towards its seating it will start to restrict the flow of fuel with the result that the pressure in the bore will increase. Since the valve element 19 is unbalanced this increasing pressure will urge the valve element to the closed position very quickly so that delivery of fuel through the injection nozzle will follow very quickly upon energization of the actuator. The actuator remains energized and does of course provide sufficient force to maintain the valve element 21 in contact with its seating against the high pressure of fuel developed in the bore.

Figure 2:
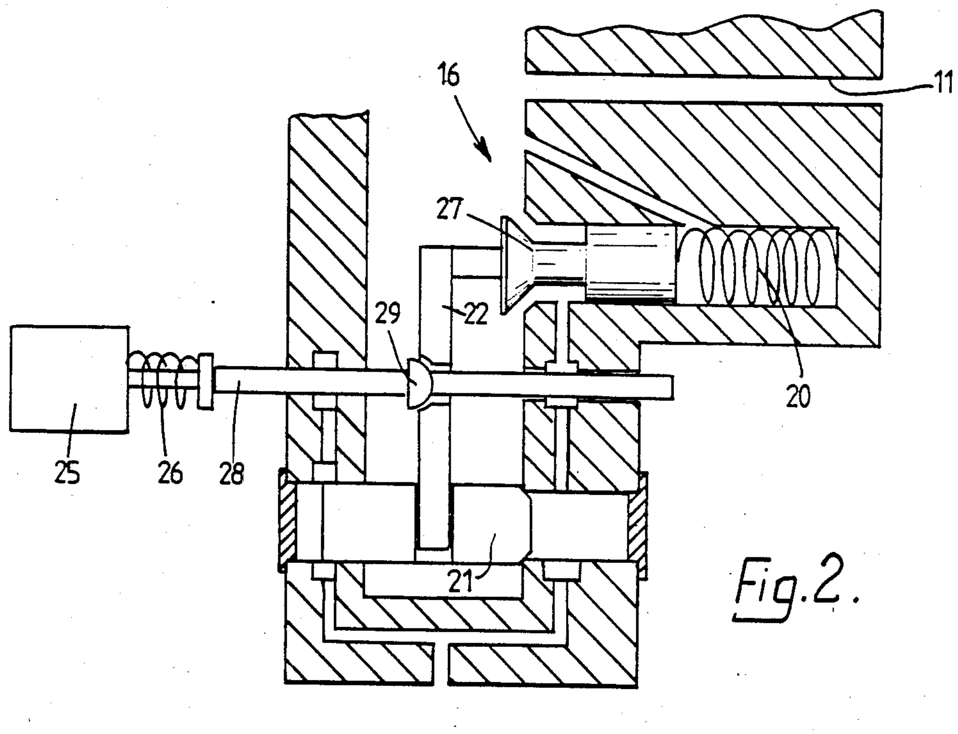
FIG. 2 is a diagrammatic representation of a more practical form of part of the apparatus seen in FIG. 1.

In the embodiment of FIG. 1 the rod 24 is unbalanced and will itself be subjected to the high pressure of fuel generated in the bore. In the more practical arrangement shown in FIG. 2, the rod 28 is exposed at both ends to a low pressure so that it is itself pressure balanced. Moreover, intermediate its ends the rod is provided with a shaped flange 29 which provides the pivot for the beam 22 the latter being shaped for co-operation with the pivot surface ideally spherical, provided by the flange. It will also be noted that the valve element 27 of the valve 16 is of slightly different construction and in fact is partly pressure balanced. It is however still unbalanced in the sense that the pressure which is developed in the bore will urge the valve element to the closed position.

We claim:

1. A fuel pumping apparatus for supplying fuel to an internal combustion engine comprising a plunger reciprocable within a bore, an outlet which in use is connected to the bore at least during the time the plunger is moved inwardly to displace fuel from the bore, said outlet in use being connected to a fuel injection nozzle of the associated engine, means through which fuel can be supplied to the bore and valve means operable during inward movement of the plunger to allow fuel to escape from the bore thereby to control the amount of fuel flowing through said outlet, said valve means comprising a first valve having a valve element which in the closed position of the valve is subjected to the pressure in the bore to hold the valve closed, a second valve having a valve element which in the closed position of the valve is subjected to the pressure in the bore to open the valve, a pivotal beam interconnecting the valve elements of the two valves, a pivot for the beam, said pivot being positioned intermediate the points of contact of the beam with the valve elements, an electromagnetic actuator which when energized moves the pivot in a direction of movement substantially parallel to the axes of movement of the valve elements and in the direction of valve closure and resilient means biasing the valve element of the first valve to the open position, the arrangement being such that in the de-energized condition of the actuator the resilient means will hold the second valve closed and the first valve open and when the actuator is energized the first valve will be closed to prevent fuel escaping from the bore, the increasing pressure within the bore as the valve closes assisting closure of the valve, and the actuator maintaining the second valve closed and when the actuator is de-energerized, the second valve will open under the action of fuel pressure to permit fuel to escape from the bore.

2. An apparatus according to claim 1 in which the valve element of the second valve in the closed position thereof defines an annular area exposed to the pressure in said bore, the pressure on said annular area acting to urge the valve element to the open position, the end of the valve element remote from the seating being exposed to a low pressure.

3. An apparatus according to claim 1 or claim 2 in which said pivot for the beam is defined by a flange intermediate the ends of a rod, said ends of the rod being exposed to a low pressure whereby the rod is pressure balanced.

* * * * *